United States Patent [19]
Gipp et al.

[11] 3,963,800
[45] June 15, 1976

[54] THERMOPLASTICALLY PROCESSABLE ELASTOMERIC COPOLYESTER

[75] Inventors: Roland Gipp, Cologne; Erwin Müller, Leverkusen; Wolfgang Oberkirch, Cologne, all of Germany

[73] Assignee: Bayer Aktiengesellschaft, Germany

[22] Filed: Nov. 29, 1974

[21] Appl. No.: 528,087

[30] Foreign Application Priority Data
Dec. 4, 1973    Germany............................ 2360287

[52] U.S. Cl. .............................................. 260/860
[51] Int. Cl.² ........................................ C08L 67/02
[58] Field of Search .................................... 260/860

[56] References Cited
UNITED STATES PATENTS
3,646,159    2/1972    Miller ................................. 260/860
3,652,713    3/1972    Okozaki et al...................... 260/860

*Primary Examiner*—Donald E. Czaja
*Assistant Examiner*—S. M. Person
*Attorney, Agent, or Firm*—Connolly and Hutz

[57]    ABSTRACT

A segmented thermoplastic elastomeric copolyester comprising alternating hard segments of polyalkylene terephthalate and soft segments of a polyester containing ether groups, the said soft segments resulting from a polyester having a molecular weight greater than 6000 and a process for the production of said copolyesters.

7 Claims, No Drawings

THERMOPLASTICALLY PROCESSABLE ELASTOMERIC COPOLYESTER

The present application relates to thermoplastically processable elastomeric segmented copolyesters based on polyalkylene terephthalates and polyesters containing ether groups, and to a process for their preparation.

The preparation of thermoplastically processable elastomers of various degrees of hardness, based on segmented copolyesters, is known from numerous publications e.g. DT-OS (Geraman Published Specification) No. 2,240,801 (≙U.S. Pat. No. 3,763,109) 2,210,119, 2,035,333 (≙U.S. Pat. No. 3,651,014), 2,263,046 (≙U.S. Pat. No. 3,784,520) and 2,213,128 (≙U.S. Pat. No. 3,766,146). According to these publications terephthalic acid dialkyl esters are reacted with low-molecular and higher-molecular glycols in varing ratios. The low-molecular glycols used are alkanediols and the higher-molecular glycols used are polyalkylene oxide glycols of molecular weight about 1,000–2,000. In this reaction, high-molecular plastics consisting of different segments are produced via higher-molecular polyalkylene terephthalates. The so-called hard segments are the high-melting crystalline polyterephthalate units produced by trans-esterification of the terephthalic acid dialkyl esters with the low-molecular glycols and the so-called soft segments are the low-melting polyalkylene oxide units; the two segments are linked by head-to-tail condensation to form a block copolymer.

Both segments determine the properties of these plastics: the proportion of the highly crystalline rigid hard segments determines the hardness and the proportion of the low-melting soft segments determines the elasticity.

A significant disturbance of the segment structure during condensation would drastically change the material properties of the end product. If instead of the polyalkylene oxide glycols linear polyesters with terminal hydroxyl groups - also of molecular weight 1,000–2,000 — are employed to produce the soft segments, there is the danger that terephthalic acid mixed esters are produced in the melt, by undesired transesterification with the terepthalic acid dialkyl ester, terephthalic acid bis-(hydroxyalkyl) ester or poly-(alkylene terephthalate), with destruction of the segment structure. Aliphatic polyesters derived from glycols of low number of carbon atoms are particularly prone to this degradation reaction. According to DT-OS (German Published Specification) No. 2,035,333 (≙U.S. Pat. No. 3,651,014) this tendency of the polyesters to transesterification can be reduced somewhat by the choice of sterically hindered glycols, such as, for example, 2,2-dimethyl-propanediol, as the diol component of the polyester.

We have now found that the use as soft segment components, in copolyesters of the type generally described above, of polyesters containing ether groups and having a molecular weight greater than 6000, enables undesirable transesterification during melt condensation to be reduced or avoided.

Thus the present invention now provides a segmented thermoplastic elastomeric copolyester comprising alternating hard segments of polyalkylene terephthalate and soft segments of a polyester containing ether groups, the said soft segments resulting from a polyester having a molecular weight greater than 6000.

The present invention also provides a process for producing the copolyester of the invention as defined in the preceding paragraph comprising reacting under transesterification conditions:
either
 i. a terephthalic acid dialkyl ester; with
 ii. a low-molecular glycol; and
 iii. a polyester containing ether groups and having a molecular weight greater than 6000; or
 iv. a bis-(hydroxyalkyl)-terephthalate; with
 iii. a polyester containing ether groups and having a molecular weight greater than 6000.

Surprisingly, it has been found that such higher-molecular polyesters containing ether groups — even when using the customary sterically non-hindered glycols as structural components — are outstandingly suitable for use as soft segment components. Even in the event of a transesterification reaction with terephthalic acid dialkyl esters, soft segments of high molecular weight remain preserved after the trans-esterification and impart to the products according to the invention excellent mechanical properties and good cold flexibility even where the products possess high hardness.

Suitable polyesters (iii) having a molecular weight greater than 6000 and containing ether groups are products of molecular weight 7,000–50,000, preferably 7,000–30,000, prepared according to DT-OS (German Published Specification) No. 2,144,874 (= British patent application No. 41,361/72 (≙U.S. application Ser. No. 283,677) or DT-OS (German Published Specification) No. 2,164,309 (≙British patent application No. 59,476/72) (compare also Angew. Makromolekul. Chemie 26, 16 (1972)) in the presence of etherification catalysts, particularly preferentially in the presence of chlorosulphonic acid. Etherified poly-(diethylene glycol adipates) (=poly-(3-oxa-pentylene-(1,5) adipates)) prepared in this way have proved to be particularly suitable.

The molecular weight was determined as a number-average up to values of 20,000 by determination of terminal groups (hydroxyl number), and for values above 20,000 by measuring the inherent viscosity.

Higher-molecular polyesters containing ether groups, according to DOS (German Published Specification) No. 2,144,874, are polyesters obtainable from dicarboxylic acids or their anhydrides with cyclic acetals and/or ketals as compounds which serve to build up ester groups. Cyclic acetals and ketals which can be used are preferentially compounds of the formulae

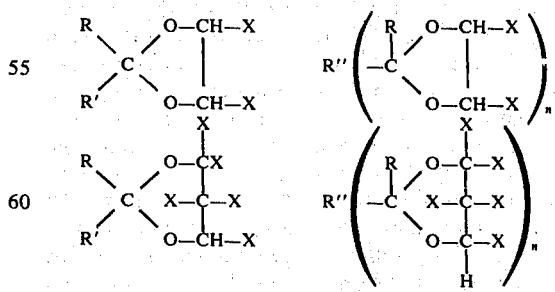

in which
R and R' are identical or different and can represent hydrogen, $C_1$–$C_{18}$-alkyl or, together, a $C_4$–$C_7$-alkylene radical, R'' denotes a n-valent aliphatic radical with 1–18 C atoms, a cycloaliphatic radical with 4–14 C atoms or an aromatic radical with 6–14 C atoms and n denotes 2 or 3 and X denotes H or $C_1$–$C_8$-alkyl.

The cyclic ketals or acetals are usually employed in such amounts that there is at least 1 mol of the cyclic ketal or acetal grouping per 2 mols of carboxyl groups. Possible dicarboxylic acids are preferably aliphatic dicarboxylic acids or their anhydrides; aliphatic polyesters possessing carboxyl groups are also used preferentially.

Higher-molecular polyesters containing ether groups which are employed particularly preferentially are those polyesters, according to DOS (German Published Specification) No. 2,164,309, which are obtainable by reaction of dihydroxy compounds possessing carboxylic acid ester groups, of the formula

in which

R is a 2-valent aliphatic radical with 2 to 18 C atoms, preferably with 4 to 12 C atoms, a cycloaliphatic radical with 4 to 14 C atoms or a 2-valent radical, produced by abstraction of terminal carboxylic acid groups or carboxylic acid ester groups, of a polyester of molecular weight 100 to 10,000, preferably 500 to 5,000, R' is a hydrogen atom or a $C_1$–$C_6$-alkyl radical, preferably a methyl radical, and n is 1 or 2, in the presence of etherification catalysts, at temperatures above 120°C, preferably between 150° and 220°C.

As low-molecular glycols it is possible to use glycols with 2 to 15 C atoms, preferably with 3-6 C atoms, and their mixtures, for example ethylene glycol, neopentyl glycol, 1,6-hexanediol, diethylene glycol, 1,2-propanediol and dipropylene glycol. 1,4-Butanediol is particularly suitable. 1.1–2 mols of diol are employed per mol of terephthalic acid dialkyl ester.

To shorten the reaction time, a part of the low-molecular glycols can be replaced by trifunctional hydroxy compounds with 3 to 6 C atoms, for example by glycerine or trimethylolpropane. Suitably, 0.3–1.2 equivalents of these branching agents are used per 100 mols of terephthalic acid dialkyl ester.

The terephthalic acid dialkyl esters used are diesters of alcohols with 1 to 4 C atoms, preferably the dimethyl ester. Of course, it is also possible to employ the reaction products of terephthalic acid dialkyl esters and low-molecular glycols, that is to say the bis-(hydroxyalkyl) terephthalates, direct; in these cases, of course, the use of additional low-molecular glycols is superfluous.

As low molecular glycols, bis-(hydroxyalkyl) terephthalates and polyalkylene terephthalates there are also understood compounds whose alkylene or alkyl chains are interrupted by ether oxygen atoms, all oxygen atoms being separated from one another by at least two carbon atoms.

The proportion of the hard segments in the condensation product according to the invention is determined by the particular properties desired and is between 40 and 90% by weight. With increasing proportion of the hard segments, the hardness increases and the cold flexibility decreases.

Preferably the process according to the invention is carried out either 1. by reacting 10–75 wt.% of the terephthalic acid ester
   i. with 9–70 wt.% of low-molecular glycol (ii) and 6–70 wt.% of polyester (iii), referred to the total weight of compounds participating in the transesterification;

or 2. by reacting 40–90 wt.% of bis-(hydroxyalkyl) terephthalate (iv) and 10–60 wt.% of polyester (iii), referred to the total weight of compounds participating in the transesterification.

The process of the invention is preferably carried out in the following stages:

i. heating the reactants in the melt in the presence of at least one transesterification catalyst, preferably a tetra-alkyl titanate the alkyl groups of which contain up to 6 carbon atoms each, especially tetrabutyl titanate, preferably under atmospheric pressure, to 130°–180°C with stirring until the bul of the alcoholic component eliminated from the terephthalic acid dialkyl ester (i) has been driven off;

ii. heating then the reactants during about 2 hours to 200°–300°C under nitrogen at sub-atmospheric pressure (e.g. under waterpump vacuum) with stirring, and stirring under these conditions until the bulk of the glycol liberated and any other volatile reaction products have been driven off; and iii. raising the temperature gradually to 240°–260°C, preferably about 250°C, while lowering the pressure to less than 1 mm of mercury.

The reaction is generally stopped when the viscosity of the melt has ceased to rise.

It is advisable to add, before, during or after the condensation, anti-aging agents and anti-hydrolysis agents which substantially increase the stability of the products of the process. Suitable stabilisers for this purpose include phenols and phenol derivatives, preferably sterically hindered phenols, which contain alkyl substituents with 1–6 carbon atoms in the two o-positions relative to the phenolic hydroxyl group, and amines, preferably secondary arylamines and their derivatives, they are employed in amounts of 0.2-'' % by weight based on the copolyester produced.

Special examples of suitable stabilisers are 4,4'-bis-(2,6-di-tert.-butylphenol), 1,3,5-trimethyl-2,4,6-tris-(3,5-di-tert.-butyl-4-hydroxybenzyl)-benzene, 4,4'-butylidene-bis-(6-tert.-butyl-m-cresol), 3,5-di-tert.-butyl-4-hydroxy-benzylphosphonic acid diethyl ester, N,N'-bis-($\beta$-naphthyl)-p-phenylene-diamine, N,N'-bis-(1-methylheptyl)-p-phenylenediamine and phenyl-$\beta$-naphthylamine. 4,4'-Bis-($\alpha$,$\alpha$-dimethylbenzyl)-diphenylamine or 1,3,5 -tris-(3,5-di-tert.-butyl-4-hydroxy-hydrocinnamoyl)-hexahydro-s-triazine are used particularly preferentially.

UV-stabilisers such as substituted benzophenones or benztriazoles can also be added to the transesterification melt. Suitable anti-hydrolysis agents are, for example, monocarbodiimides and above all polycarbodiimides (compare W. Neumann, J. Peter, H. Holtschmidt and W. Kallert, Proceedings of the 4th Rubber Technology Conference, London, 22nd–25th May, 1962, pages 738–751), in amounts of 0.2–5% by weight relative to the copolyester produced.

To modify the copolyesters according to the invention it is possible to add known fillers such as, for example, carbon black, kieselguhr, kaolin and other clays, calcium carbonate, aluminium oxide, glass fibres and inorganic pigments.

If flame-repellent products are desired it is possible to add 5 to 15 % by weight of flame-proofing agents. Suitable flameproofing agents include known flameproofing agents, for example $Sb_2O_3$, tetrabromophthalic anhydride, hexabromocyclododecane, tetrachlorobisphenol and tetrabromobisphenol or tris-(2,3-dichloropropyl) phosphate.

Furthermore, processing auxiliaries, such as release agents, can be used in effective amounts.

From the point of view of processing technology the products according to the invention offer the advantage, over the known thermoplastic elastomeric copolyesters, that they can be moulded at substantially lower temperatures, whether by injection moulding or hotpressing.

Furthermore, because of their better compatibility, they are more suitable for use in mixtures with other thermoplastics, for example with poly-(1,4-cyclohexanedimethanol terephthalate)(=poly-(1,4-hexahydroxylylene terephthalate)), ethylene-vinyl acetate copolymers, acrylic ester rubber and thermoplastically processable polyurethane elastomers, but preferably with polyvinyl chloride, than are the previously known segmented elastomeric copolyesters.

The products according to the invention can be employed with advantage in all cases where a combination of hardness and cold flexibility is desired, say, for example, in coachwork and for the manufacture of low pressure tyres for vehicles, sheathing of hoses and cables, pipes, and flexible drive couplings.

EXAMPLE 1

A mixture of 776 parts by weight of dimethyl terephthalate, 720 parts by weight of 1,4-butanediol, 300 parts by weight of poly-(diethylene glycol adipate)(-=poly-(3-oxa-pentylene-(1,5) adipate)) (OH number: 8.5), prepared according to DOS (German Published Specification) No. 2,164,309, and 0.3 part by weight of tetrabutyl titanate is heated, with stirring, to 150°C in a sulphonation beaker provided with a plane-ground lid, distillation bridge, stirrer, internal thermometer and gas inlet tube, whilst removing the methanol formed by transesterification by distillation under normal pressure. The elimination of methanol is completed by gradually raising the internal temperature to 180°C. The reaction mixture is then heated to 220°C over the course of approx. 2 hours, in a nitrogen atmosphere under reduced pressure (approx. 13 mm Hg) whilst stirring, and is stirred for a further 2 hours under these conditions whilst at the same time distilling off volatile products (mainly 1,4-butanediol) of the transesterification. After raising the temperature to 250°C, which is done over the course of approx. 2 hours under a pressure of approx. 0.3 mm Hg, and stirring for 2 hours under these conditions, a highly viscous melt of the copolyester A is obtained, which rapidly solidifies on cooling.

The poly-(diethylene glycol adipates) etherified according to DOS (German Published Specification) No. 2,164,309, which are used here and in the subsequent examples, are prepared as follows:

1 kg of poly-(diethylene glycol adipate) (OH number: 40 ± 5) is dehydrated at a temperature of 150°C and a pressure of 13 mm Hg. 0.06 ml of chlorosulphonic acid (etherification catalyst) is then added, the mixture is gradually heated to 220°C under a nitrogen atmosphere whilst stirring and distilling off volatile components under a pressure of <0.5 mm Hg and stirring at 220°C/<0.5 mm Hg is continued until the desired OH number of the reaction product has been reached.

EXAMPLE 2

Copolyester B is prepared in accordance with the process described in Example 1, from the same amounts by weight of the starting components mentioned there, except that the polyester possessing ether groups which is employed is poly-(diethylene glycol adipate)(=poly-(3-oxa-pentylene-(1,5) adipate)) obtained according to DOS (German Published Specification No. 2,164,309 and having an OH number of 15.8.

EXAMPLE 3

Copolyester C is prepared according to the process described in Example 1 from 582 parts by weight of dimethyl terephthalate, 540 parts by weight of 1,4-butanediol, 464 parts by weight of poly-(diethylene glycol adipate) (=poly-(3-oxa-pentylene-(1,5) adipate)) (OH number: 8.0), obtained according to DOS (German Published Specification) No. 2,164,309, and 0.3 part by weight of tetrabutyl titanate.

The properties of the copolyesters A, B and C listed in the table which follows were determined on test specimens obtained by injection moulding whilst the TMA examinations were carried out on samples of the unprocessed materials.

| Property | Test specification DIN | Unit of measurement | Copolyester A | B | C |
|---|---|---|---|---|---|
| Softening point | — | °C | approx. 180 | approx. 180 | approx. 138 |
| Shore hardness A/D | 53,505 | — | 98/61 | 99/63 | 96/43 |
| Tensile strength | 53,504 | kp/cm² | 212 | 328 | 165 |
| Elongation at break | 53,504 | % | 362 | 367 | 462 |
| Elasticity | 53,512 | % | 43 | 43 | 50 |
| Abrasion resistance | 53,516 | mm³ | 15 | 14 | 36 |
| Glass transition temperature $T_1$ of the soft segments (determined by TMA examination) | — | °C | −11 | −3 | −26 |

What we claim is:

1. A segmented thermoplastically processable elastomeric copolyester which consists essentially of a plurality of recurring polyalkylene terephthalate units and of higher molecular weight polyesters carrying ether groups produced by the process of gradually heating a. 10–75% by weight of terephthalic acid dialkyl esters having 1 to 4 carbon atoms in the alkyl moieties, b. 9–70% by weight of a glycol having 2 to 15 carbon atoms and
c. 6–70% by weight of polyesters containing ether groups and having a molecular weight of greater than 6,000 or
  i. 10–60% by weight of polyesters containing ether groups and having a molecular weight of greater than 6,000 and
  ii. 40–90% by weight of bis-(hydroxyalkyl) terephthalate having 1 to 15 carbon atoms in the alkyl moieties in the presence of a transesterification catalyst to a temperature of 240°–260°C. initially at atmospheric pressure and subsequently under reduced pressure until the maximum viscosity of the reaction mixture is obtained.

2. The copolyester of claim 1 wherein (b) has from 3 to 6 carbon atoms.

3. The copolyester of claim 1 wherein (b) is 1,4-butanediol.

4. The copolyester of claim 1 wherein said polyester of (c) or (i) is a polyester containing residues of a dicarboxylic acid or anhydride thereof and a cyclic acetal, cyclic ketal or mixture thereof.

5. The copolyester of claim 4 wherein said cyclic acetal or cyclic ketal or mixture thereof is based on a member selected from the group consisting of

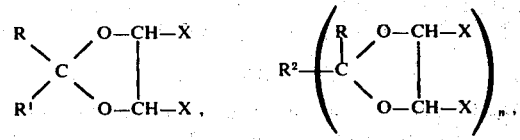

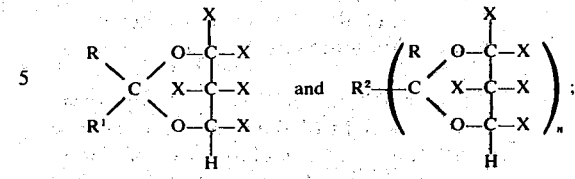

wherein R and R¹ are the same or different and are selected from the group consisting of hydrogen and alkyl having 1 to 18 carbon atoms or R and R¹ are taken together and are alkylene having 4 to 7 carbon atoms; R² is an n-valent aliphatic hydrocarbon radical having 1 to 18 carbon atoms, an n-valent cycloaliphatic hydrocarbon radical having 4 to 14 carbon atoms or an n-valent aromatic hydrocarbon radical having 6 to 14 carbon atoms; $n$ is 2 or 3 and X is hydrogen or alkyl having 1 to 8 carbon atoms.

6. The copolyester of claim 1 wherein the polyester of (c) and of (i) is of the formula

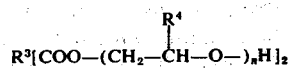

wherein $R^3$ is a divalent aliphatic hydrocarbon radical containing 2 to 18 carbon atoms, a divalent cycloaliphatic hydrocarbon radical containing from 4 to 14 carbon atoms or a divalent radical consisting of a polyester having a molecular weight of 100 to 10,000 and having the terminal carboxylic acid or carboxylic acid ester groups thereof removed; $R^4$ is hydrogen or alkyl having 1 to 6 carbon atoms and $n$ is 1 or 2.

7. The copolyester of claim 1 in which (a) is dimethylterephthalate.

* * * * *

UNITED STATES PATENT AND TRADEMARK OFFICE
CERTIFICATE OF CORRECTION

PATENT NO. : 3,963,800
DATED : June 15, 1976
INVENTOR(S) : Roland Gipp et al

It is certified that error appears in the above-identified patent and that said Letters Patent are hereby corrected as shown below:

Col. 4, line 28, "200-300°C." should read -- 200-230°C. --;

line 47, "0.2-"%" should read -- 0.2-2% --.

Col. 7, lines 30-35, the second structural formula should read

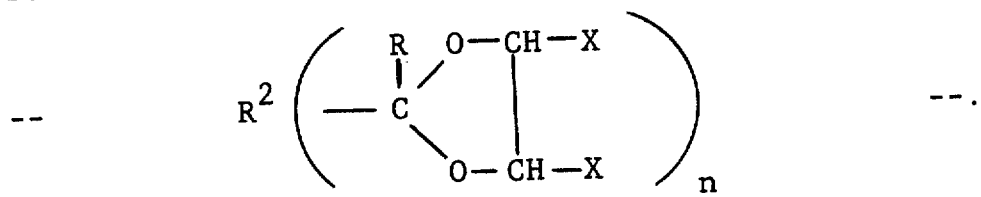

Col. 8, lines 2-9, the second structural formula should read

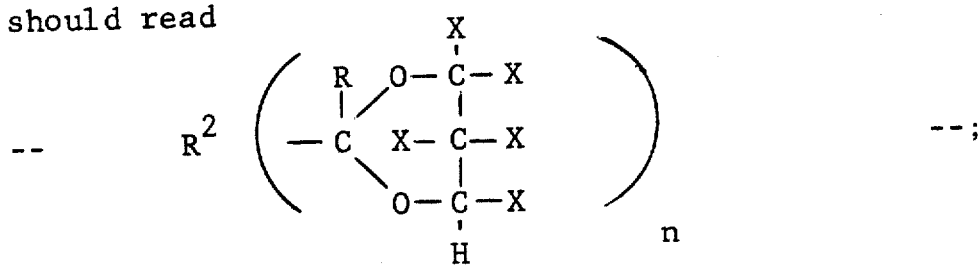

line 21, "(i) is of the formula" should read -- (i) is made from a dihydroxy compound of the formula --.

Signed and Sealed this

Fifteenth Day of March 1977

[SEAL]

Attest:

RUTH C. MASON
Attesting Officer

C. MARSHALL DANN
Commissioner of Patents and Trademarks